(12) United States Patent
Wilson

(10) Patent No.: US 8,973,335 B2
(45) Date of Patent: Mar. 10, 2015

(54) MODULAR ASSEMBLY SHELTER

(75) Inventor: Derick Wilson, Nottingham (GB)

(73) Assignee: Blue Planet Buildings (UK) Limited, Nottinghamshire (GB)

( * ) Notice: Subject to any disclaimer, the term of this patent is extended or adjusted under 35 U.S.C. 154(b) by 0 days.

(21) Appl. No.: 13/148,008

(22) PCT Filed: Feb. 3, 2010

(86) PCT No.: PCT/GB2010/000175
§ 371 (c)(1),
(2), (4) Date: Aug. 9, 2011

(87) PCT Pub. No.: WO2010/089535
PCT Pub. Date: Aug. 12, 2010

(65) Prior Publication Data
US 2011/0289860 A1   Dec. 1, 2011

(30) Foreign Application Priority Data

Feb. 5, 2009   (GB) .................................. 0901880.5

(51) Int. Cl.
| *E04H 1/00* | (2006.01) |
| *E04B 1/343* | (2006.01) |
| *E04H 1/12* | (2006.01) |
| *H01L 31/048* | (2014.01) |
| *H02J 7/35* | (2006.01) |

(52) U.S. Cl.
CPC .......... *E04B 1/34315* (2013.01); *E04H 1/1205* (2013.01); *H01L 31/0482* (2013.01); *E04B 2001/34389* (2013.01); *H02J 7/355* (2013.01); *Y02B 10/12* (2013.01); *Y02E 10/50* (2013.01)

USPC .......................... 52/745.02; 52/79.5; 52/173.3

(58) Field of Classification Search
USPC .............. 52/79.1, 79.5, 220.1, 275, 276, 278, 52/578, 582.1, 745.02, 173.3, 79.9
See application file for complete search history.

(56) References Cited

U.S. PATENT DOCUMENTS 2,751,635 A * 6/1956 Donnahue .......................... 52/69
3,012,291 A * 12/1961 Rice .................................. 52/69

(Continued)

FOREIGN PATENT DOCUMENTS

| DE | 10300656 B3 | 9/2004 |
| DE | 102004020023 A1 | 11/2005 |

(Continued)

OTHER PUBLICATIONS

International Search Report for PCT/GB2010/000175 dated Jul. 28, 2010.

*Primary Examiner* — Brent W Herring
(74) *Attorney, Agent, or Firm* — Heslin Rothenberg Farley & Mesiti P.C.

(57) ABSTRACT

Apparatus manually configurable from a portable unit configuration into an assembled configuration provides a rigid shelter including a solar powered electricity supply circuit. The rigid shelter including the solar powered electrical supply circuit is manually configurable into reusable disassembled parts. Wall elements are releasably connectable between a base element and a roof element. Corner elements are used to define a unit. A plurality of units may be arranged as a single storey shelter or as a multi-storey shelter. External shelter elements have solar energy collector cells that may form part of an external element. A shipping container arrangement includes a plurality of stacked portable unit configurations.

2 Claims, 20 Drawing Sheets

(56) References Cited

U.S. PATENT DOCUMENTS

Figure 1:
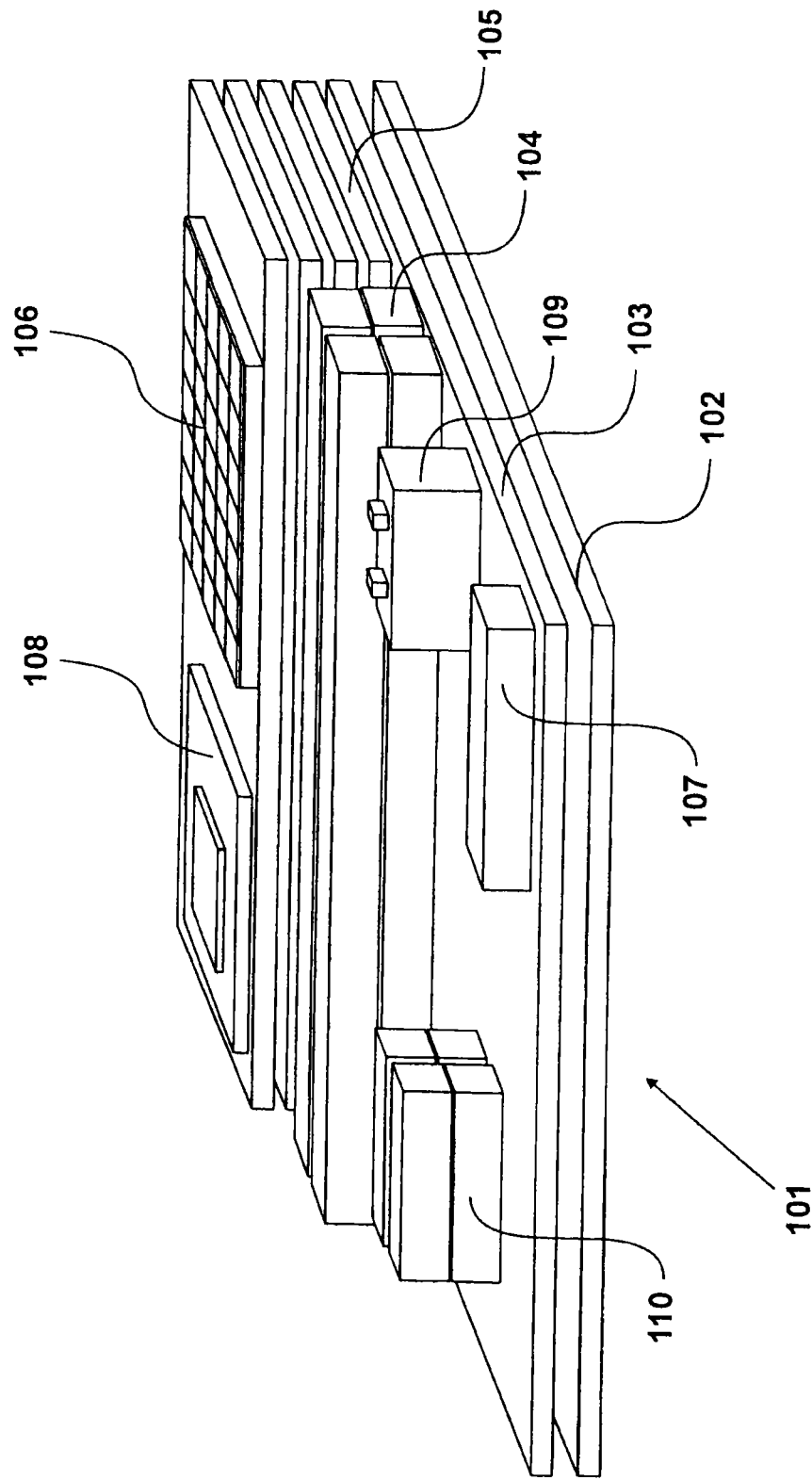

| | | | |
|---|---|---|---|
| 3,436,881 A * | 4/1969 | Schlecht | 52/91.3 |
| 4,534,141 A * | 8/1985 | Fagnoni | 52/68 |
| 4,633,626 A * | 1/1987 | Freeman et al. | 52/71 |
| 4,854,094 A * | 8/1989 | Clark | 52/79.1 |
| 5,184,436 A * | 2/1993 | Sadler | 52/79.1 |
| 5,596,844 A * | 1/1997 | Kalinowski | 52/79.5 |
| 5,647,181 A * | 7/1997 | Hunts | 52/282.1 |
| 5,724,774 A * | 3/1998 | Rooney | 52/79.5 |
| 6,393,775 B1 * | 5/2002 | Staschik | 52/79.1 |
| 6,688,048 B2 * | 2/2004 | Staschik | 52/79.1 |
| 6,757,591 B2 * | 6/2004 | Kramer | 700/288 |
| 6,983,567 B2 * | 1/2006 | Ciotti | 52/79.5 |
| 7,117,645 B2 * | 10/2006 | Bzorgi | 52/79.5 |
| 7,284,709 B2 * | 10/2007 | Guyer | 237/12.1 |
| 7,581,357 B2 * | 9/2009 | Richardson et al. | 52/79.5 |
| 7,770,337 B2 * | 8/2010 | Mower et al. | 52/79.1 |
| 7,770,339 B2 * | 8/2010 | Mower et al. | 52/93.2 |
| 7,793,467 B1 * | 9/2010 | Melton et al. | 52/79.1 |
| 7,827,738 B2 * | 11/2010 | Abrams et al. | 52/79.1 |
| 7,874,107 B1 * | 1/2011 | Medley et al. | 52/79.5 |
| 8,132,372 B2 * | 3/2012 | Mower et al. | 52/79.1 |
| 2003/0009954 A1 | 1/2003 | Bradley | |
| 2005/0279034 A1 * | 12/2005 | Tsang | 52/79.1 |
| 2006/0048459 A1 * | 3/2006 | Moore | 52/79.1 |
| 2007/0022643 A1 * | 2/2007 | Johnson, Jr. | 40/446 |
| 2007/0175108 A1 * | 8/2007 | Stein et al. | 52/79.5 |
| 2008/0134589 A1 * | 6/2008 | Abrams et al. | 52/79.1 |
| 2009/0223143 A1 * | 9/2009 | Esposito | 52/79.1 |
| 2009/0223144 A1 * | 9/2009 | Leahy | 52/79.1 |
| 2010/0205870 A1 * | 8/2010 | Cobb | 52/79.1 |
| 2011/0041415 A1 * | 2/2011 | Esposito | 52/12 |
| 2011/0047891 A1 * | 3/2011 | Andretich | 52/79.5 |
| 2011/0056146 A1 * | 3/2011 | Appert | 52/79.1 |
| 2011/0252719 A1 * | 10/2011 | Wallance | 52/79.5 |
| 2012/0023837 A1 * | 2/2012 | Eisenbeisz | 52/79.5 |
| 2012/0110925 A1 * | 5/2012 | Weber | 52/79.1 |

FOREIGN PATENT DOCUMENTS

| | | |
|---|---|---|
| GB | 2150170 A | 6/1985 |
| JP | 2008184801 A | 8/2008 |
| WO | 2008005307 A2 | 1/2008 |

* cited by examiner

US 8,973,335 B2

MODULAR ASSEMBLY SHELTER

CROSS REFERENCE TO RELATED APPLICATIONS

This application is a national stage filing under section 371 of International Application No. PCT/GB2010/000175 filed on Feb. 3, 2010, and published in English on Aug. 12, 2010 as WO 2010/089535 and claims priority to GB application No. 0901880.5 filed on Feb. 5, 2009, the entire disclosure of all of these applications being hereby incorporated herein by reference.

FIELD

The present invention relates to modular assembly shelter apparatus configurable into an assembled configuration providing a rigid shelter comprising a solar powered electricity supply circuit.

BACKGROUND

It is known for shelters to be provided at localities where people are in need of a substitute residence in the event that previous accommodation has become unsuitable for occupation. It is also know for shelters to be provided at localities where people are in need of a temporary building in a location undergoing development. Thus, a shelter may be required in a disaster zone, such as may arise from the effects of a hurricane, flooding, a landslide, famine or war, or on a construction site, for example.

It is desirable for a shelter suitable for use in such circumstances to be deliverable quickly and to be easily and swiftly erectable. It is beneficial for the shelter to be rigid, such that it is perceived as a secure building, and to be locatable anywhere, regardless of the terrain.

SUMMARY

According to a first aspect of the present invention, there is provided modular assembly shelter apparatus, comprising: a base element, a roof element, a plurality of corner elements, a plurality of wall elements, a photovoltaic solar collector, an electricity storage device, electrical circuit componentry, and a utility panel; said apparatus manually configurable from a portable unit configuration into an assembled configuration providing a rigid shelter comprising a solar powered electricity supply circuit.

Preferably, the modular assembly shelter apparatus further comprises first connector assembly components comprising at least a base connector for attachment to said base element and a first wall connector for attachment to a wall element, said first connector assembly components configured to be assembled into a first connector assembly configured to releasably and detachably connect said wall element and said base element, and second connector assembly components comprising at least a roof connector for attachment to said roof element and a second wall connector for attachment to said wall element, and said second connector assembly components configured to be assembled into a second connector assembly configured to releasably and detachably connect said wall element and said roof element. The modular assembly shelter apparatus may comprise a storey element, and be configured to be assembled to provide a rigid shelter having an additional storey. The modular assembly shelter apparatus may comprise external shelter elements having solar energy collector cells that form part of the external element.

According to a second aspect of the present invention, there is provided a method of providing a rigid shelter comprising a solar powered electricity supply circuit, comprising the steps of: a) receiving disassembled parts obtained from the disassembly of modular assembly shelter apparatus according to the first aspect in said assembled configuration providing a rigid shelter comprising a solar powered electricity supply circuit, b) providing apparatus according to the first aspect comprising said disassembled parts received at step a), and c) configuring said apparatus provided at step b) into an assembled configuration providing a rigid shelter comprising a solar powered electricity supply circuit.

DRAWINGS

Figure 2:
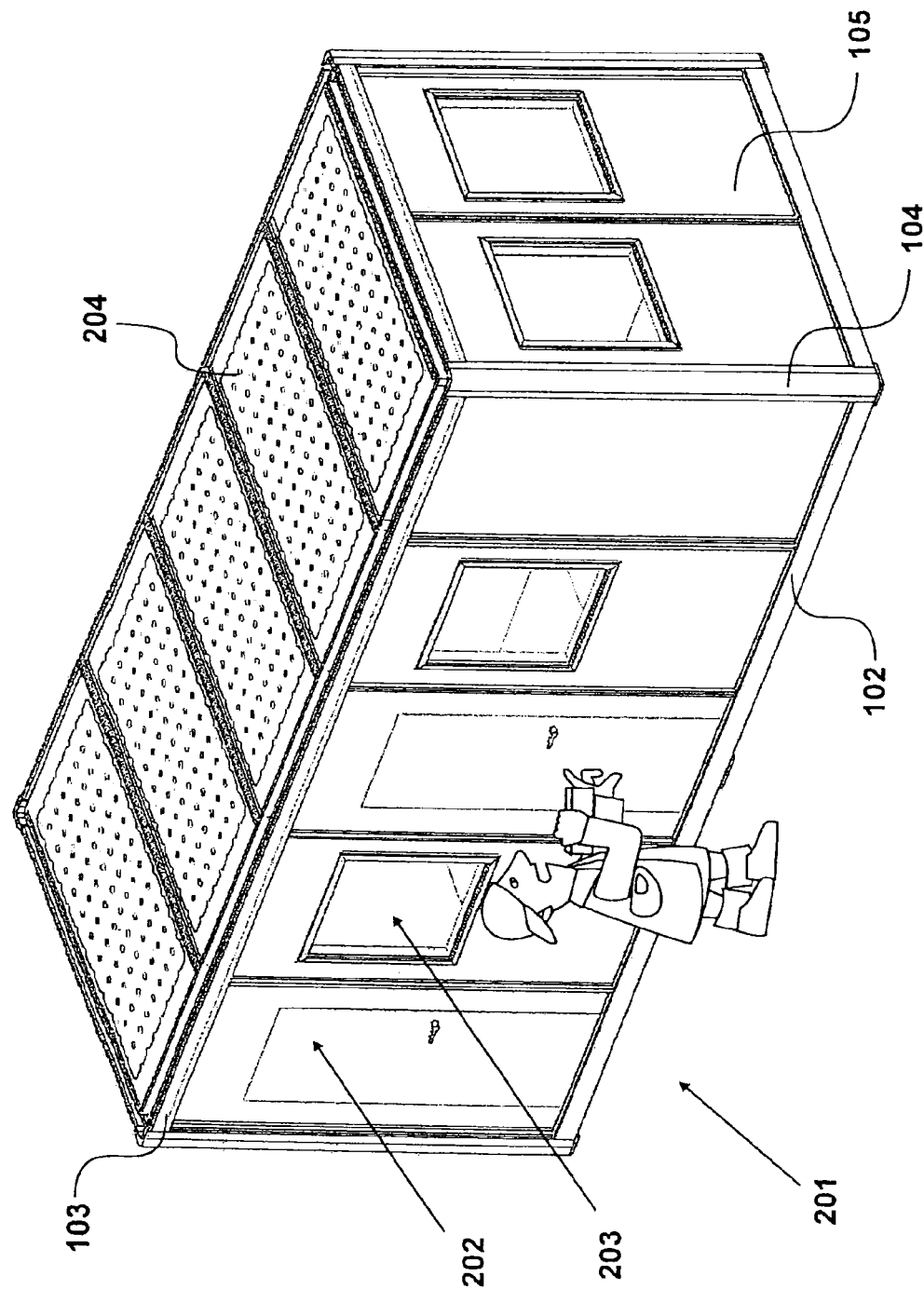
Figure 3:
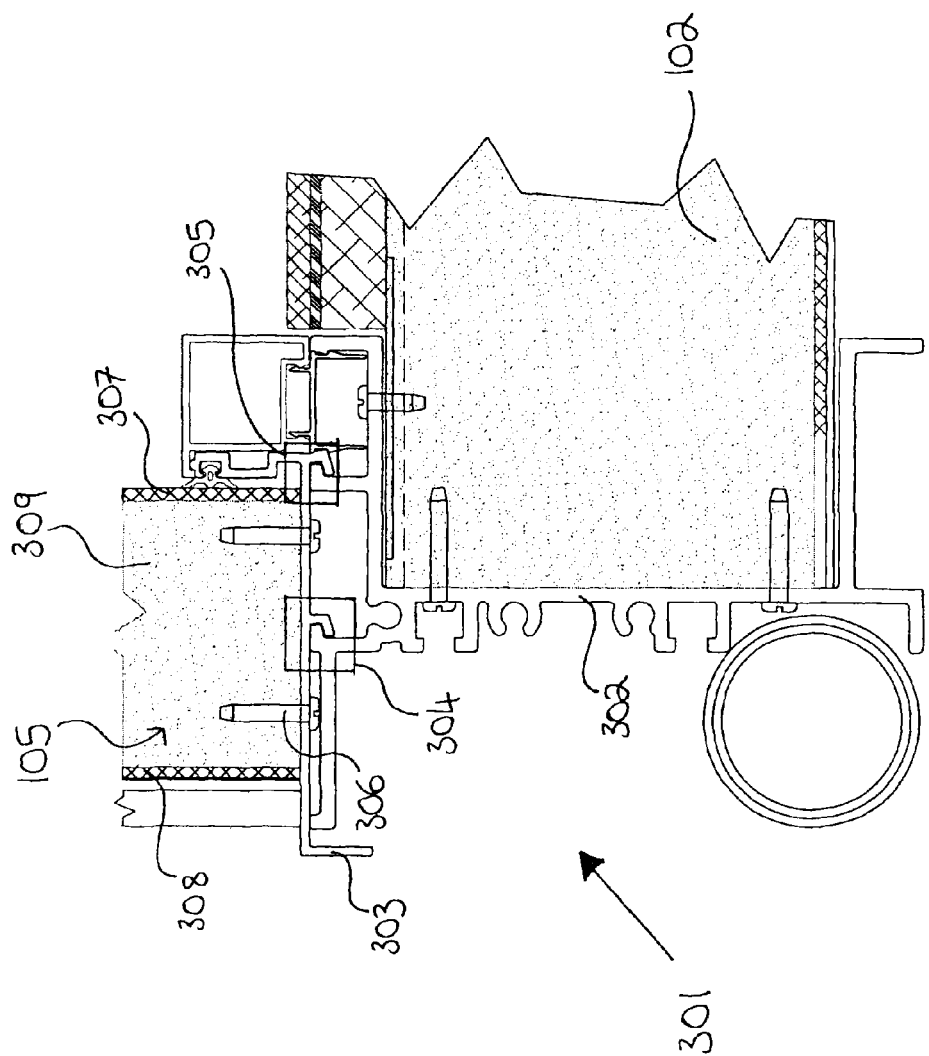
Figure 4:
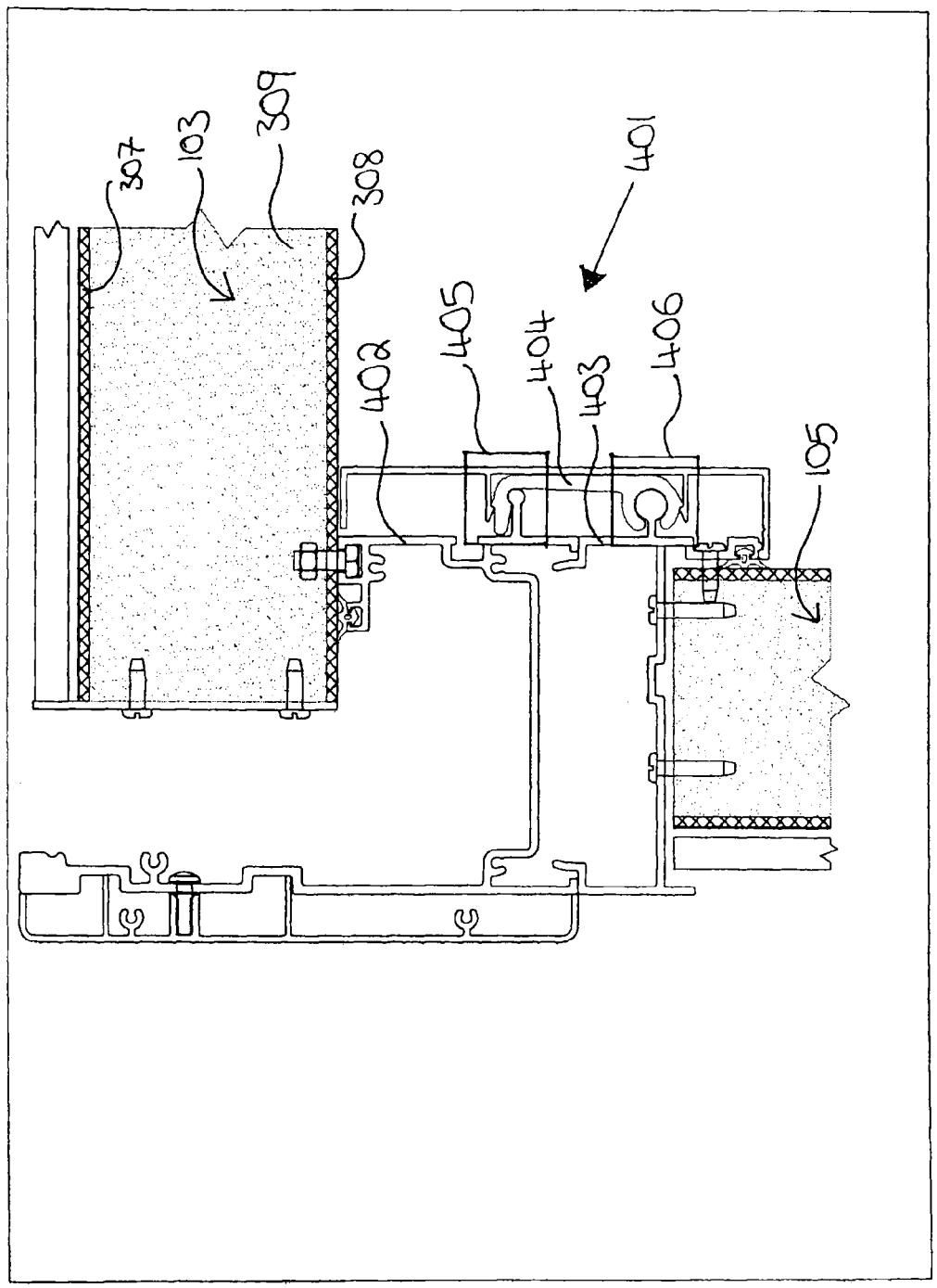
Figure 5:
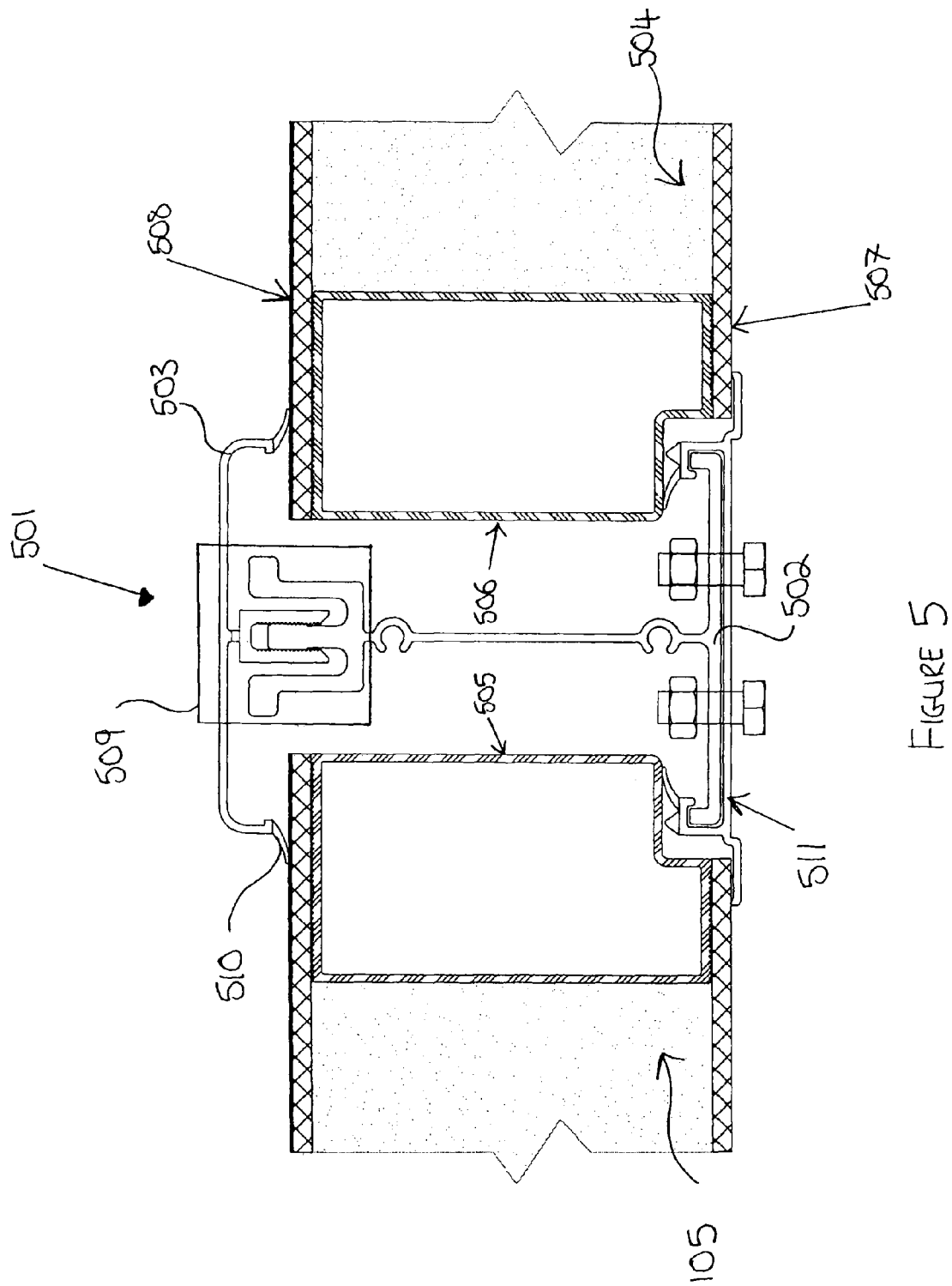
Figure 6:
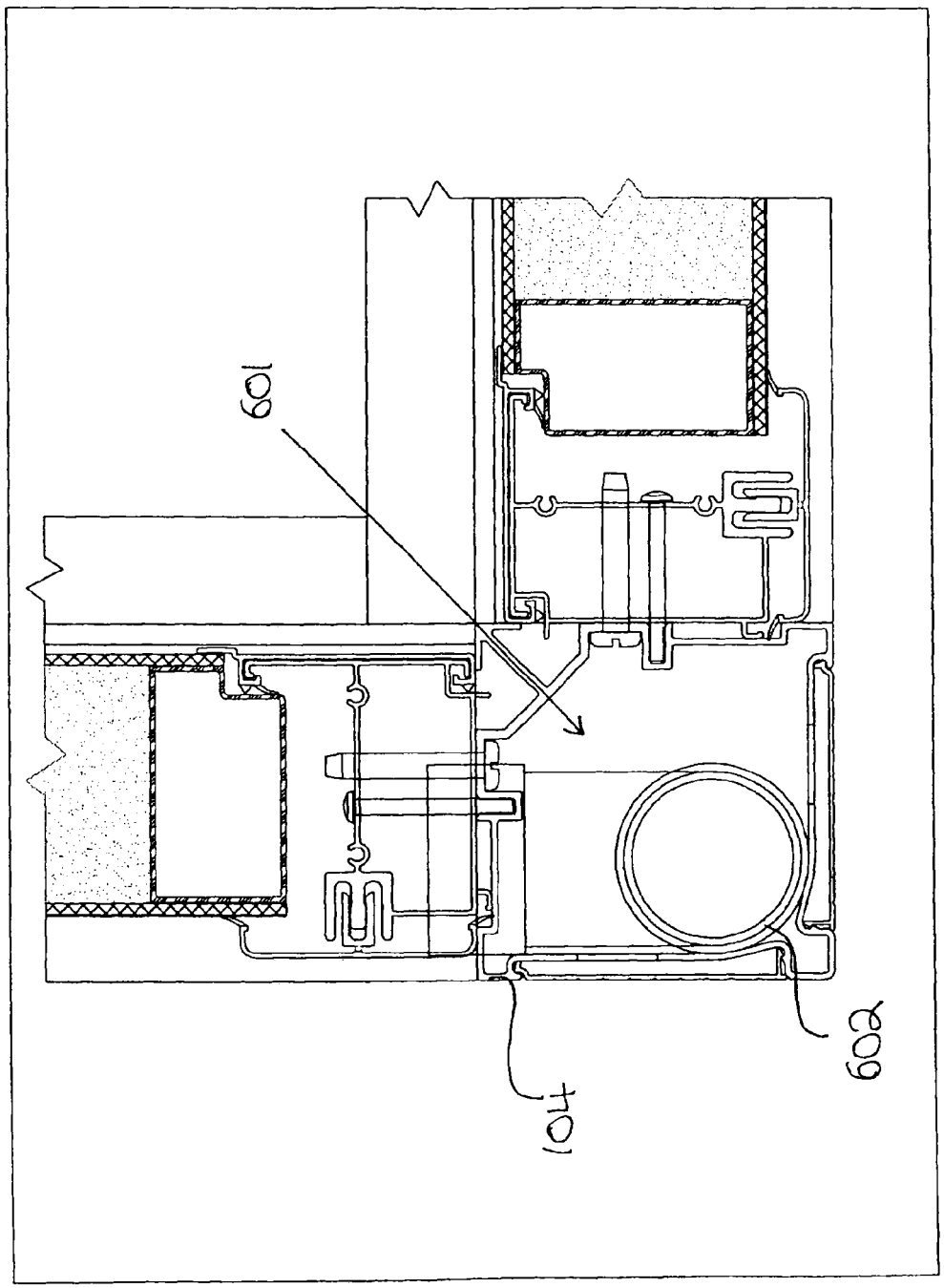
Figure 7:
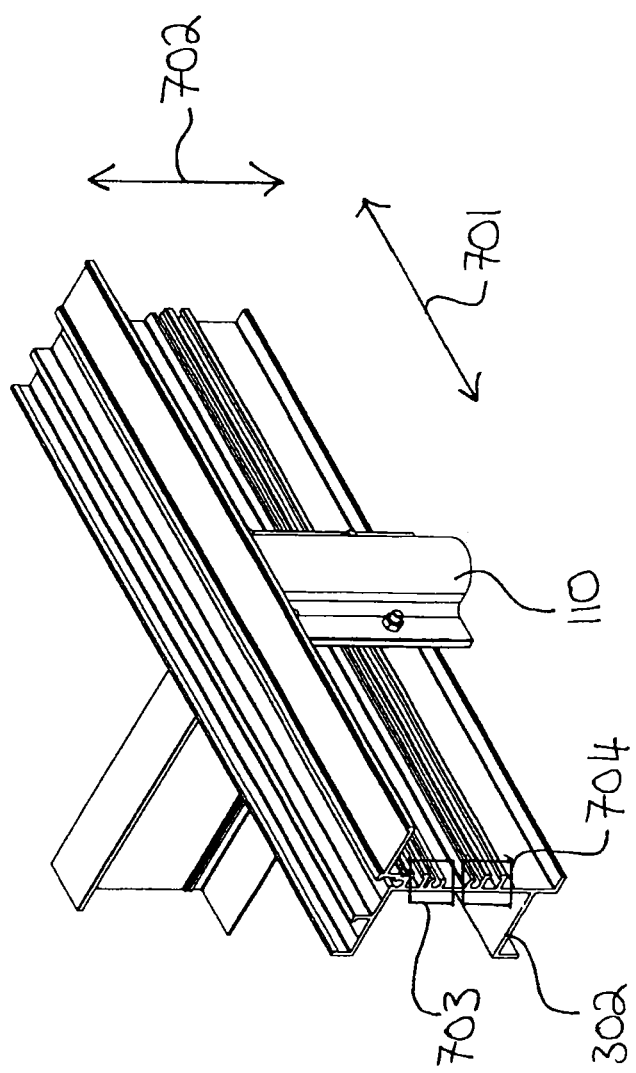
Figure 8:
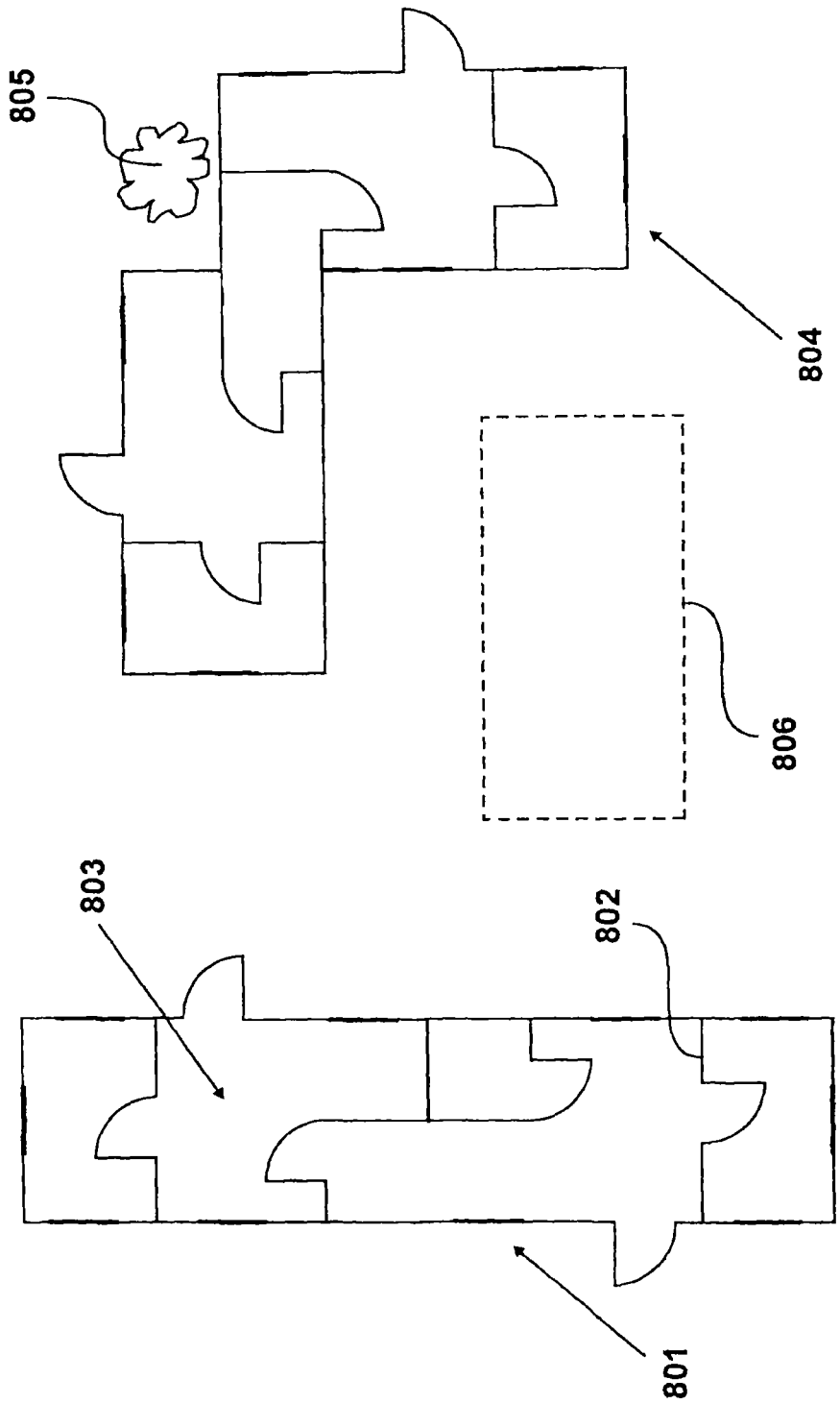
Figure 9:
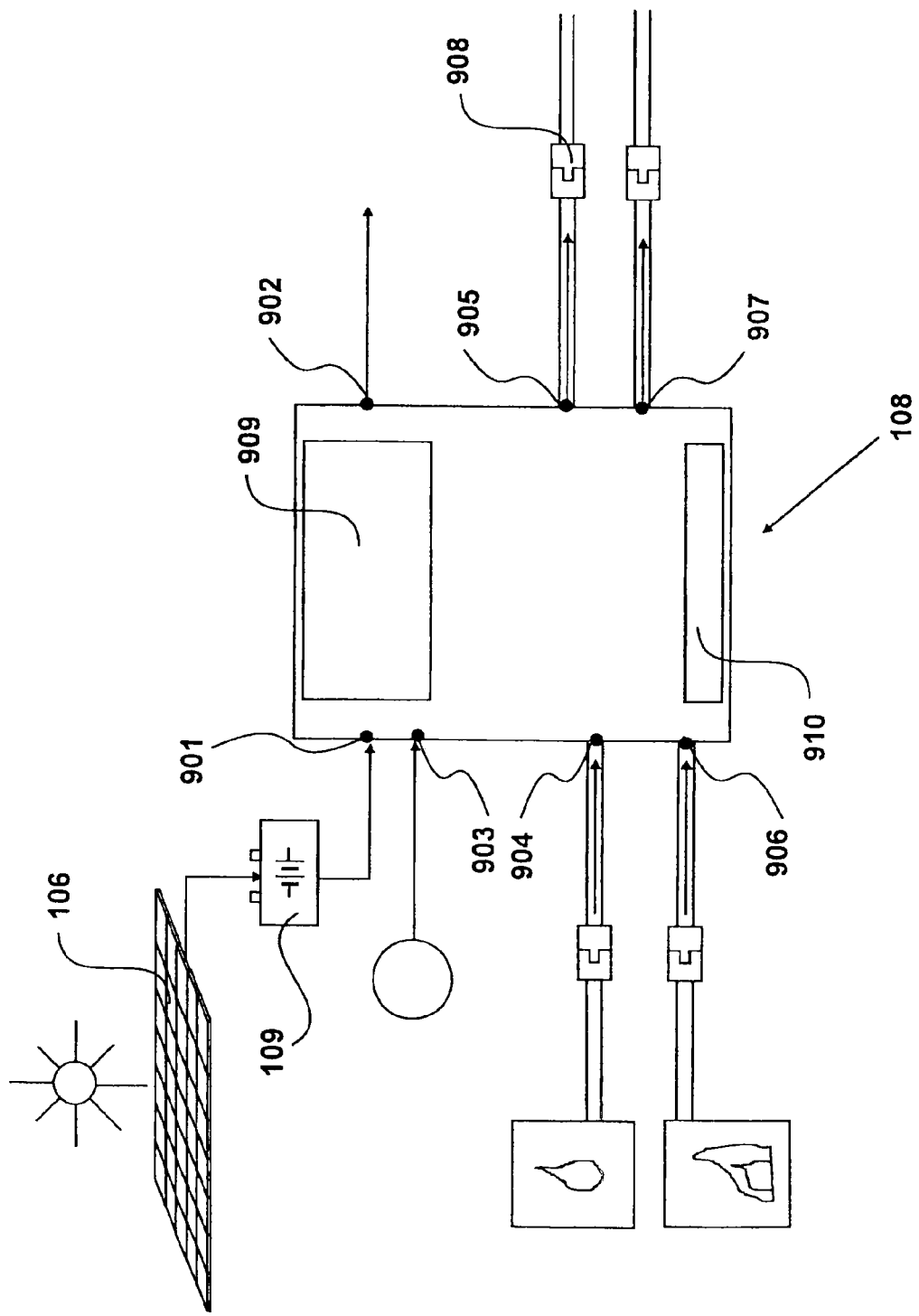
Figure 10:
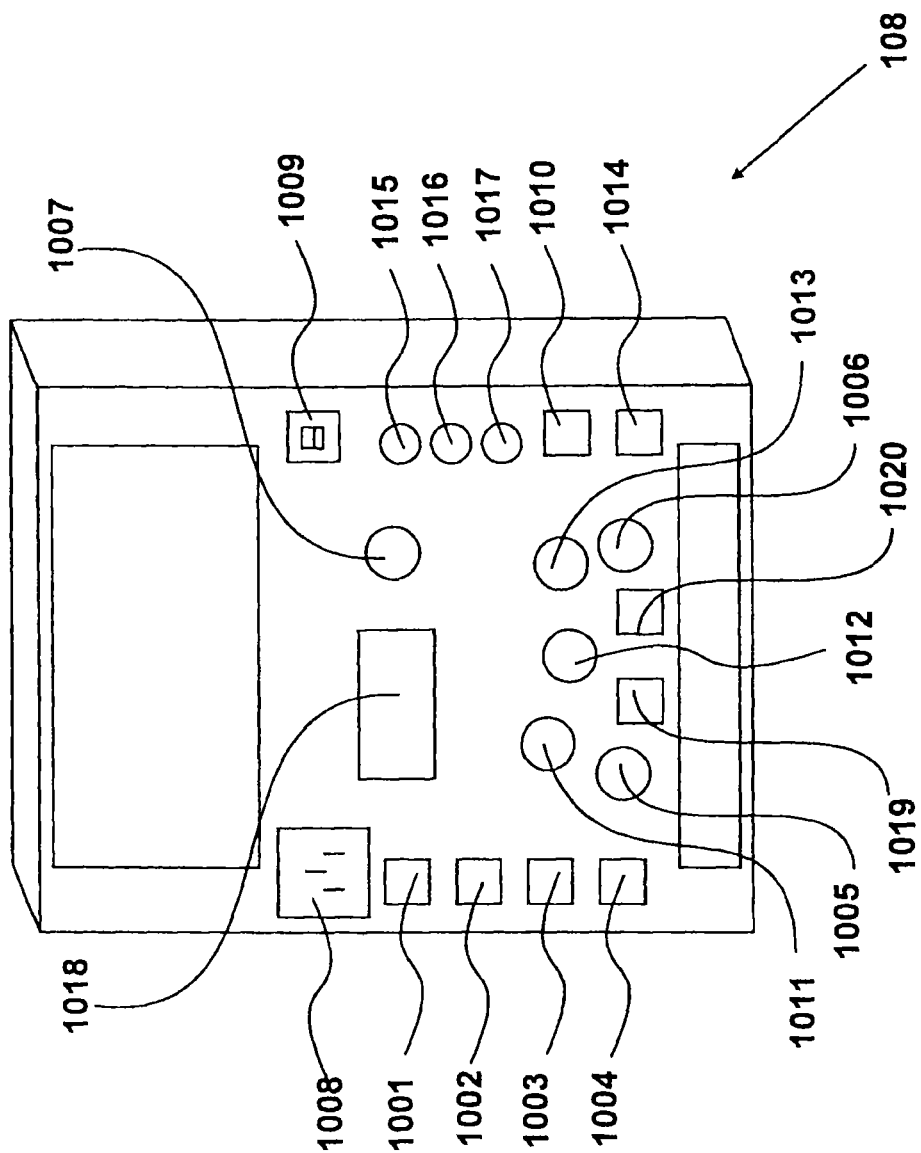
Figure 11:
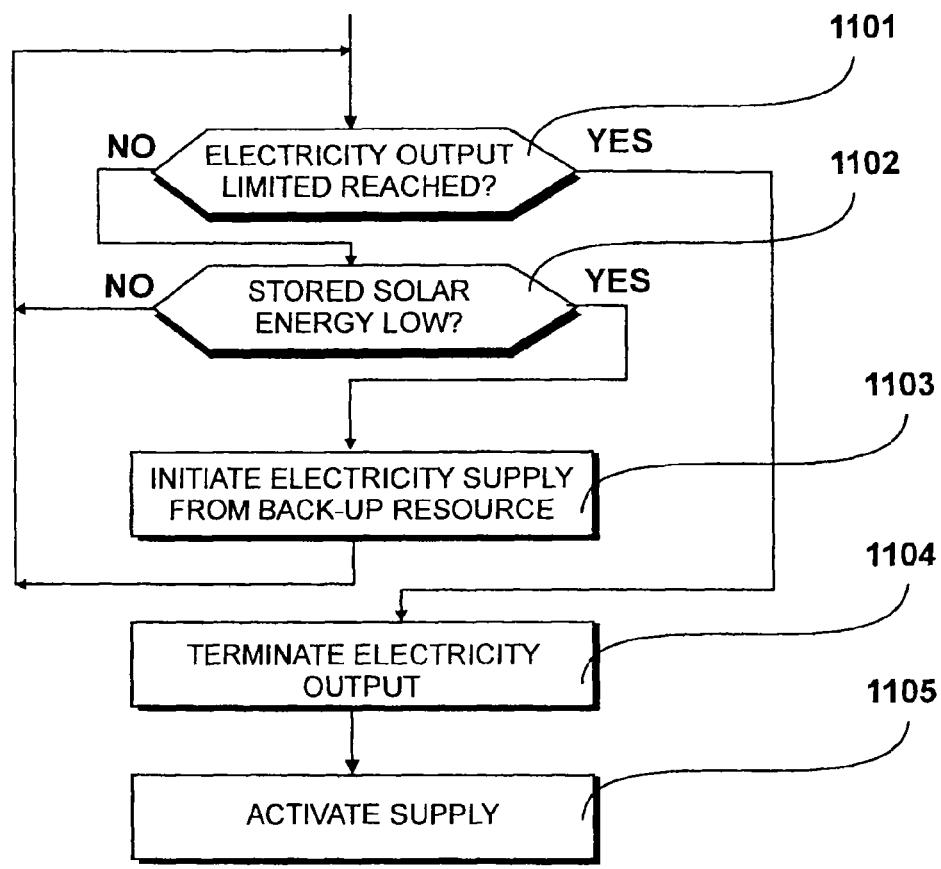
Figure 12:
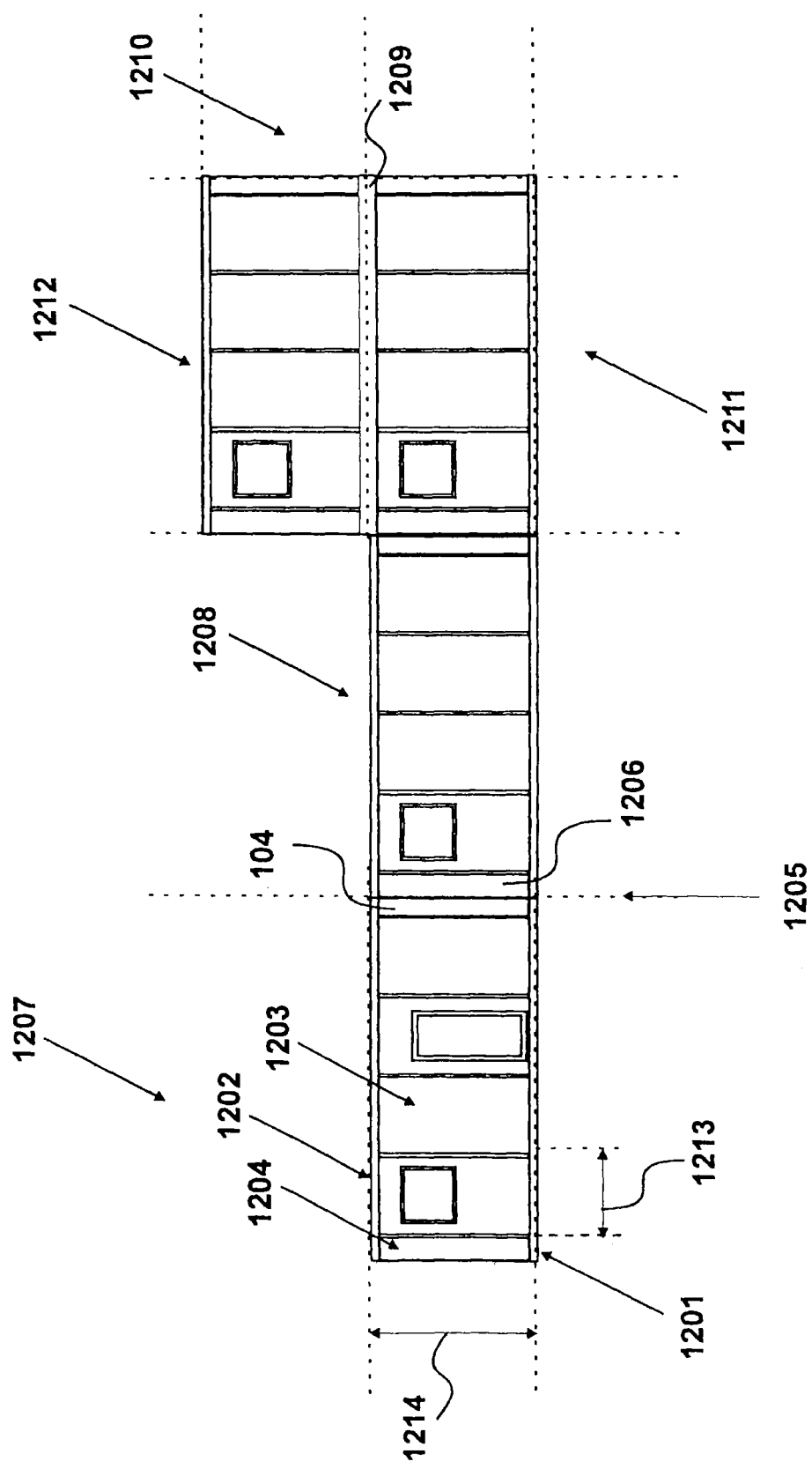
Figure 13:
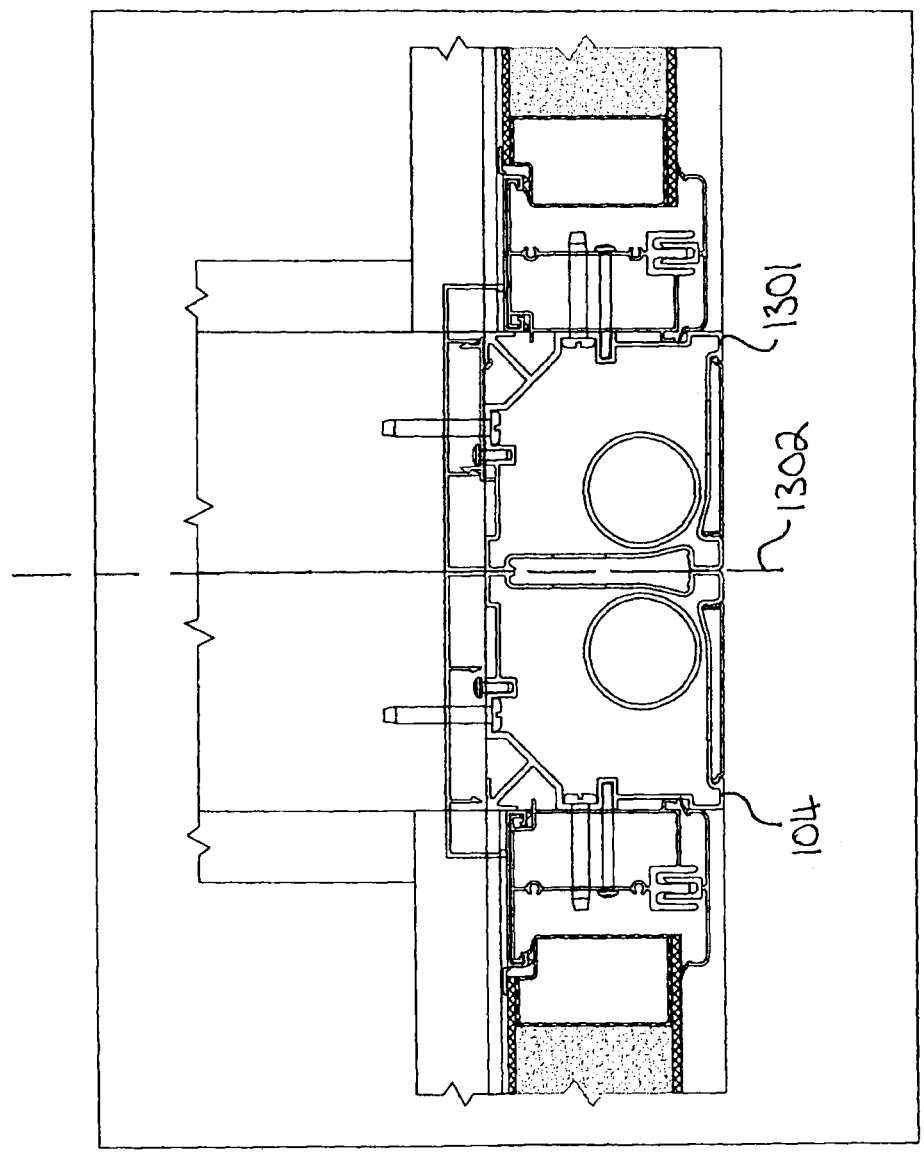
Figure 14:
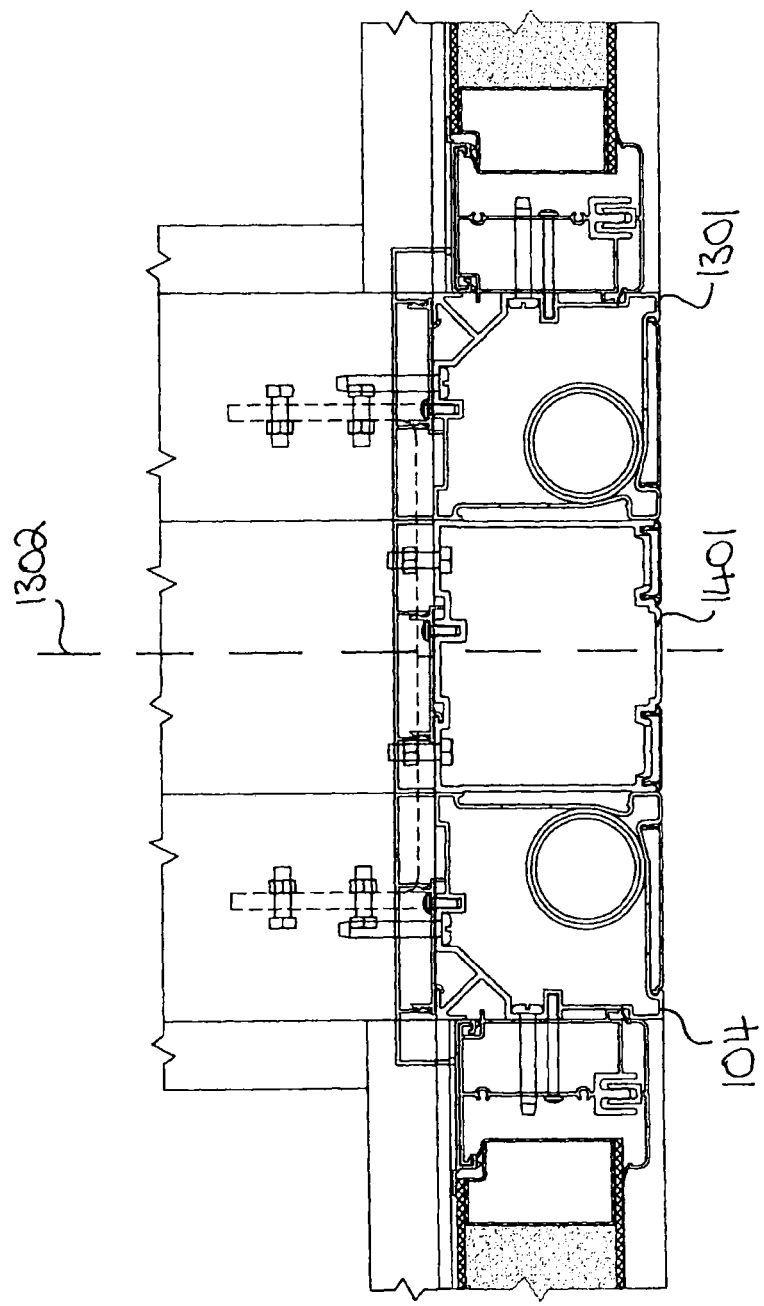
Figure 15:
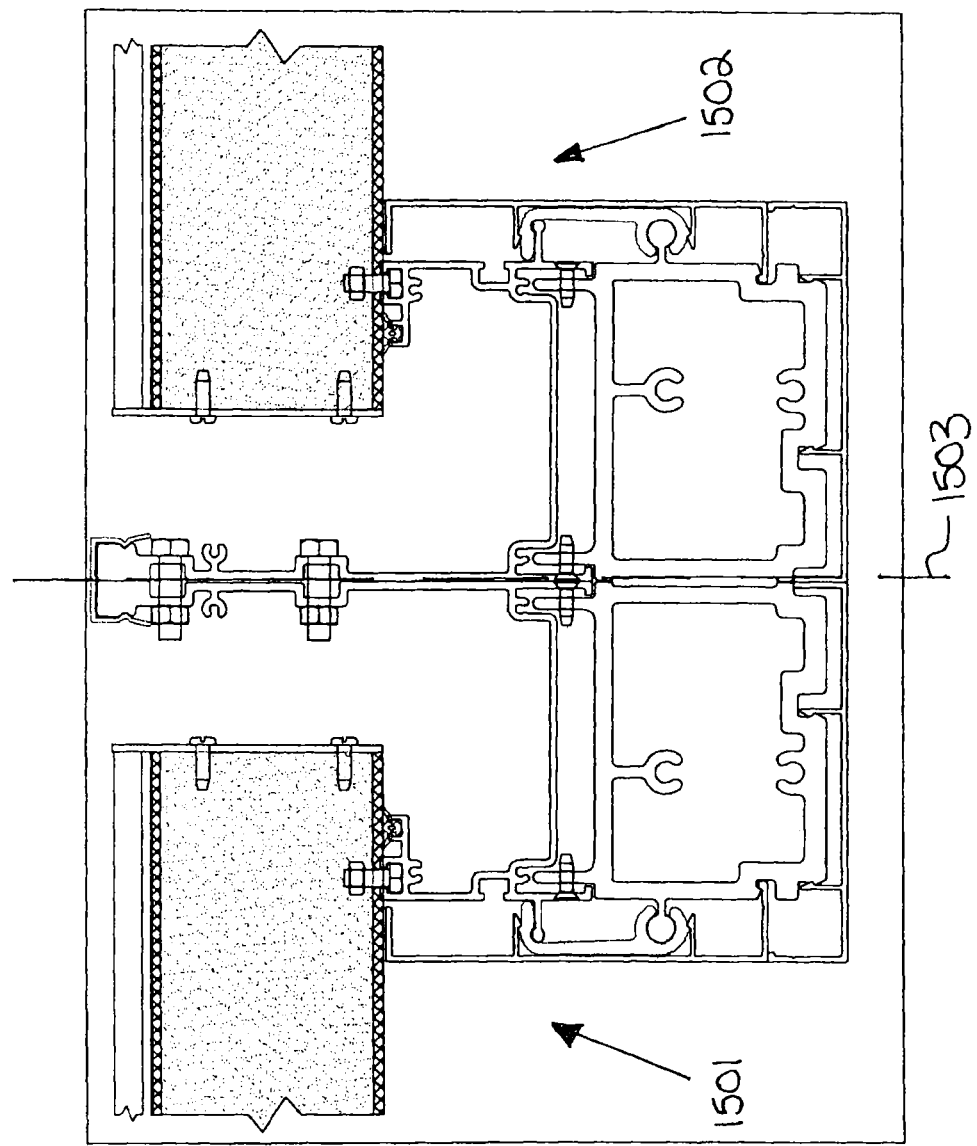
Figure 16:
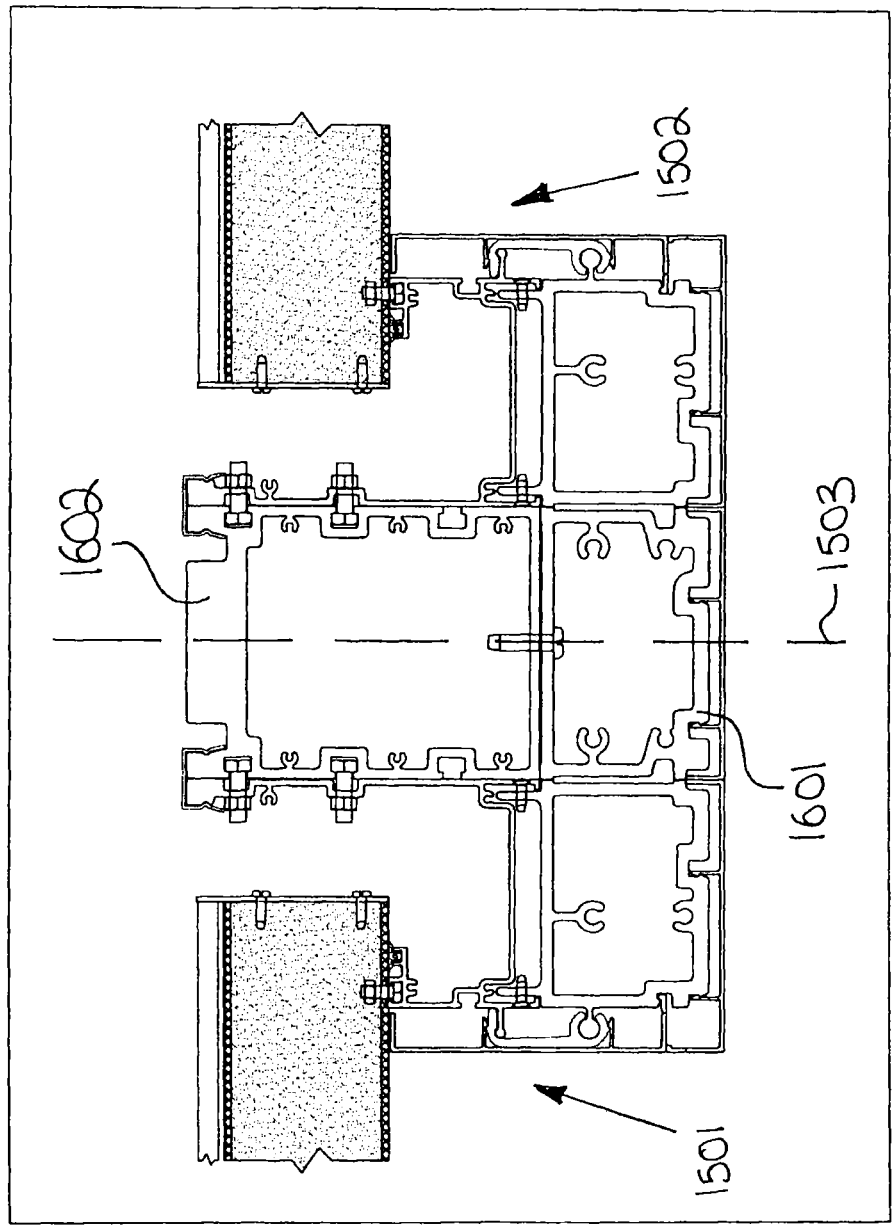
Figure 17:
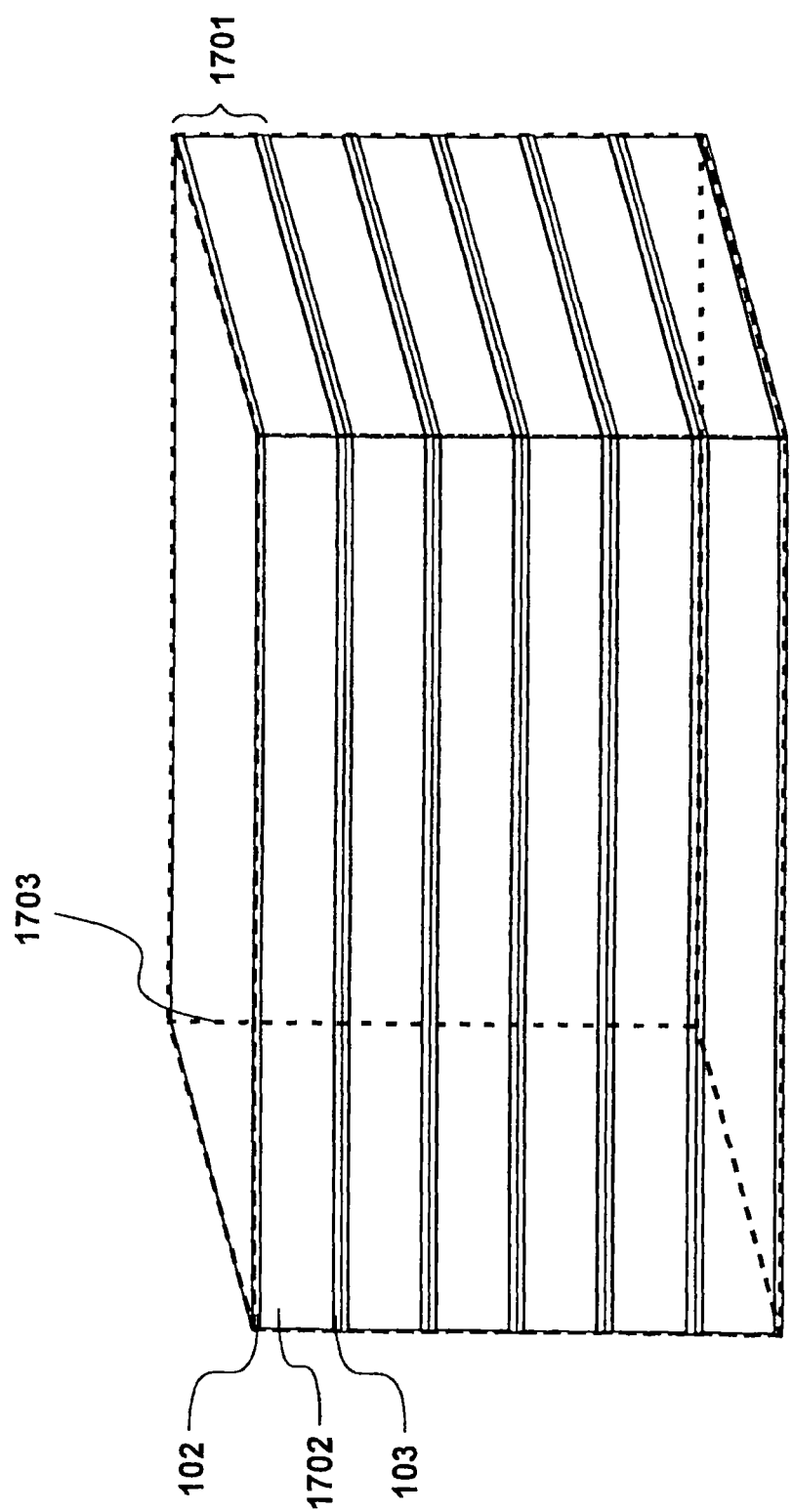
Figure 18:
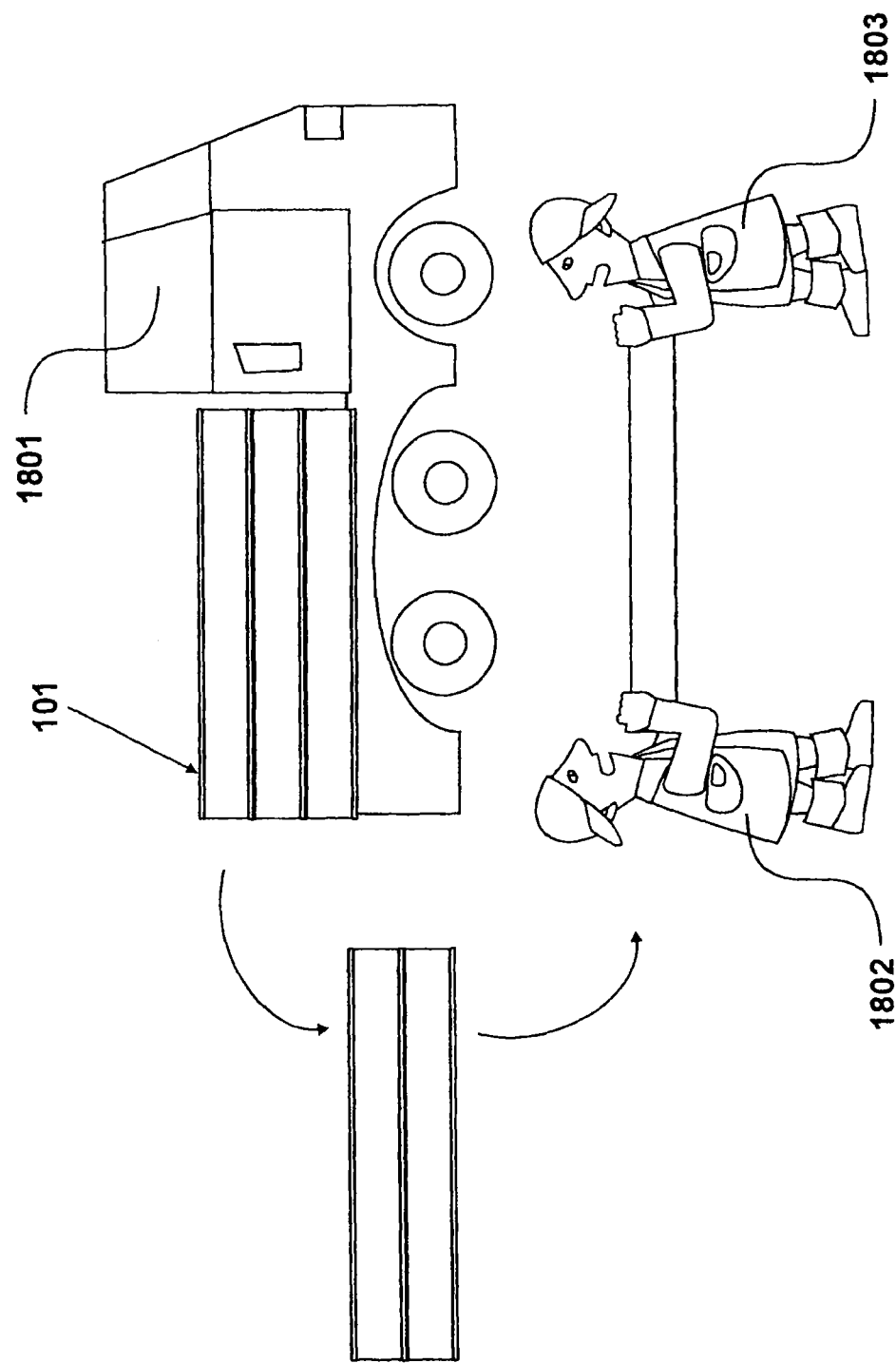
Figure 19:
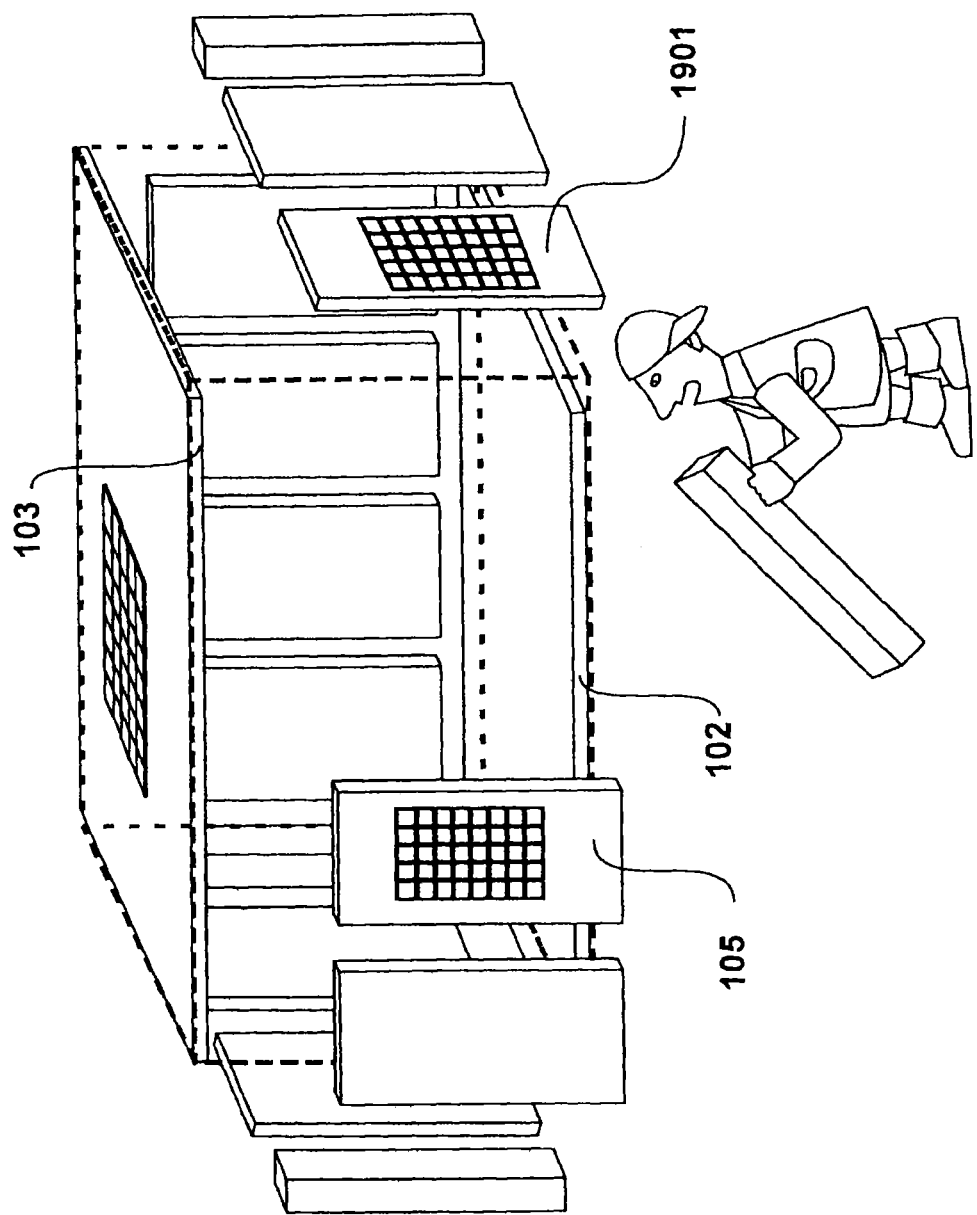
Figure 20:
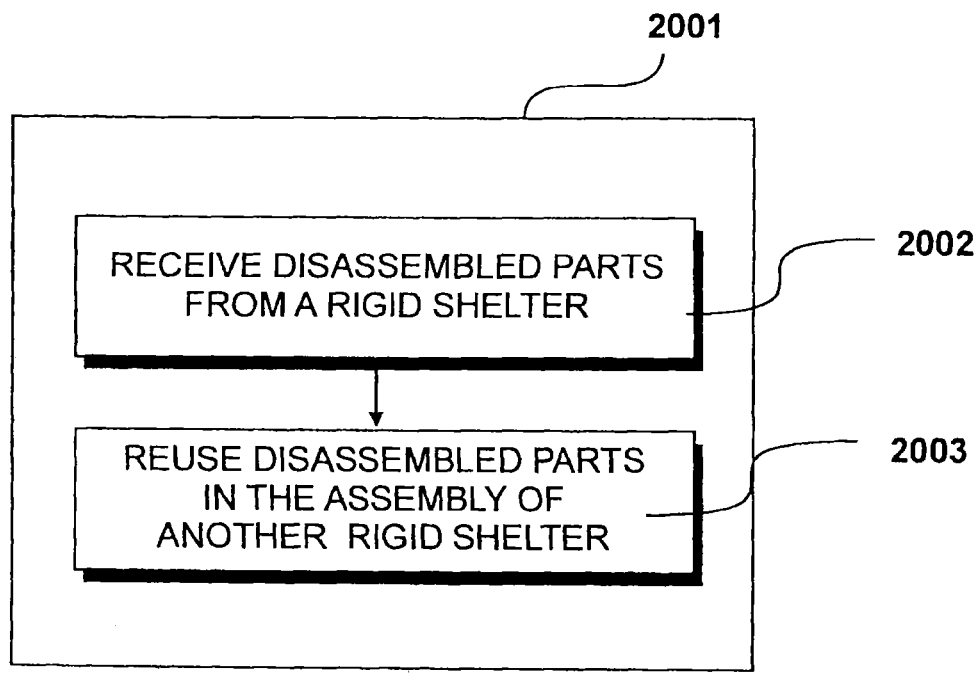

FIG. 1 shows modular assembly shelter apparatus;
FIG. 2 shows a rigid shelter comprising a solar powered electricity supply circuit;
FIG. 3 shows first connector assembly components;
FIG. 4 shows second connector assembly components;
FIG. 5 shows third connector assembly components;
FIG. 6 shows a corner element;
FIG. 7 shows a support device;
FIG. 8 illustrates configurability of a rigid shelter provided by modular assembly shelter apparatus;
FIG. 9 shows a schematic of utility provision;
FIG. 10 shows features of a utility panel;
FIG. 11 shows example energy management functions that may be provided by the modular assembly shelter apparatus;
FIG. 12 illustrates configurations of modular assembly shelter apparatus units;
FIG. 13 shows corner elements in a first linked assembly arrangement;
FIG. 14 shows corner elements in a second linked assembly arrangement;
FIG. 15 shows eaves beam assemblies in a first linked assembly arrangement;
FIG. 16 shows eaves beam assemblies in a second linked assembly arrangement;
FIG. 17 shows modular assembly shelter apparatus in a portable unit configuration;
FIG. 18 illustrates delivery of modular assembly shelter apparatus to a desired receiving site;
FIG. 19 illustrates dismantling of a rigid shelter comprising a solar powered electricity supply circuit to provide disassembled parts; and
FIG. 20 shows steps in a method of providing a rigid shelter comprising a solar powered electricity supply circuit.

DESCRIPTION

FIG. 1

Modular assembly shelter apparatus is shown in FIG. 1. Modular assembly shelter apparatus 101 comprises a base element 102, a roof element 103, a plurality of corner elements, such as corner element 104, and a plurality of wall elements, such as wall element 105. The apparatus also comprises a photovoltaic solar collector 106, electrical circuit componentry 107, a utility panel 108, an electricity storage device 109 and a plurality of support devices, such as support device 110.

As will be described in further detail below, apparatus 101 is manually configurable from a portable unit configuration into an assembled configuration providing a rigid shelter comprising a solar powered electricity supply circuit. It is, however, to be understood that other elements and components may be used in the completion of the final construction. The modular format of the apparatus provides several advantages, discussed below.

FIG. 2

A rigid shelter comprising a solar powered electricity supply circuit is shown schematically in FIG. 2. Rigid shelter 201 is assembled from the modular assembly shelter apparatus of FIG. 1. In the shown assembled configuration, each corner element, such as corner element 104, extends substantially vertically between the base element 102 and the roof element 103. The wall elements 105 similarly extend from the base element 102 to the roof element 103 and also extend in an aligned configuration between corner elements. Support devices may then extend from the base element 102 onto the support surface, to support the base element 102 relative to ground level. As shown, a wall element may provide one or more of: a door, as indicated at 202; a window, as indicated at 203; or any other similar feature, such as a hatch.

In a typical application, the rigid shelter 201 is configured to imitate a house or an office. An external surface of the rigid shelter 201 supports photovoltaic material 204. According to this illustrated example, the photovoltaic material 204 is presented along the roof of the shelter, but may additionally or alternatively be presented along the wall of the shelter. The rigid shelter 201 comprises a solar powered electricity supply circuit. This allows the rigid shelter to be sited, and used, in locations at which a mains electricity supply is not readily available, or connection to a mains supply is not viable. The environmental benefits of utilisation of renewal energy, such as solar energy, are known. However, the modular assembly shelter apparatus makes use of this technology to enable the provision of a shelter having an electricity supply when and where it is most beneficial. In this way, the apparatus provides a portable cabin having a self-contained power generation provision.

In an example, the solar powered electrical supply circuit is configured to provide 3.8 kWh in moderate light conditions. The power specification and the type and area of photovoltaic material provided may vary between applications.

FIG. 3

The modular assembly shelter apparatus enables releasable and detachable connection of each wall element between the base element and the roof element. This serves to facilitate assembly, and subsequent disassembly of the rigid shelter.

FIG. 3 shows first connector assembly components configured to be assembled into a first connector assembly configured to releasably connect a wall element and the base element. The apparatus comprises first connector assembly components, indicated generally at 301, comprising at least a base connector 302 for attachment to the base element 102 and a first wall connector 303 for attachment to a wall element 105. In FIG. 3, the first connector assembly components 301 are shown in use, in which a releasable connection between wall element 105 and base element 102 is provided. As generally indicated in zones 304 and 305, the first connector assembly components 301 provide a releasable connection in the form of the positive mechanical fit. The base connector 302 may be attached to the base element 102, and similarly the first wall connector 303 may be attached to the wall element 105, by any suitable means. In this example, mechanical fixings, such as a screw 306, is utilised for this purpose.

Features of a preferred construction of an element of the apparatus are also shown in this Figure, in which the element is a substantially planar member having a three-layer construction, made from a pair of spaced apart walls with insulation disposed therebetween. The volume between the spaced apart walls may also be used to house other items or layers. Thus, for example, wall element comprises an inner wall 307, an outer wall 308, and insulation material 309 disposed between the inner and outer walls 307, 308. According to this illustrated example, base element 102 is similarly a substantially planar member having a three-layer construction. Where a wall element provides a door or window, any suitable material or combination of materials may again be used, for example glass, wood or a plastics material for a door and glass or plastics material for a window.

In an example, the inner and outer walls may be fabricated from any suitable material or combination of materials. The inner wall may have a different fabrication from the outer wall. In an example, the walls are fabricated from plywood. The plywood may carry a skin on each face, for example a PVC (polyvinyl chloride) covering on one side and a metal sheet, such as may be made from steel or aluminium, on the other side. In an example, the insulation material 309 is a high density foam insulation material. However, the intermediate layer may be fabricated from any suitable material or combination of materials. The relative thicknesses of the inner wall, the outer wall, and the intermediate layer between these walls may vary between elements and between applications. The number of layers in the construction of an element may vary between applications. A wall element, a base element and a roof element may be fabricated from any suitable material or combination of materials and may be manufactured by any suitable construction and technique, or combination of constructions and techniques. In an example, an external shelter element, typically intended for use as a wall element or a roof element, may utilise an outer wall as a rigid substrate for photovoltaic material. In an embodiment, the modular assembly shelter apparatus comprises an external shelter element having solar energy collector cells that form part of the external element. In this way, solar energy collector cells are used as a building material. Alternatively, photovoltaic sheets may be applied to a wall element or a roof element.

FIG. 4

FIG. 4 shows second connector assembly components configured to be assembled into a second connector assembly configured to releasably connect a wall element and the roof element. The apparatus comprises second connector assembly components, indicated generally at 401, comprising at least a roof connector 402 for attachment to the roof element 103 and a second wall connector 403 for attachment to wall element 105. An intermediate connector 404 is configured to connect between the roof connector 402 and the second wall connector 403. In FIG. 4, the second connector assembly components 401 are shown in use, in which a releasable connection between wall element 105 and roof element 103 is provided. As generally indicated in zones 405 and 406, the second connector assembly components 401 provide a releasable connection in the form of the positive mechanical fit. The roof connector 402 may be attached to the roof element 103, and similarly the second wall connector 403 may be attached to the wall element 105, by any suitable means. According to this example, roof element 103 is a substantially planar member having a three-layer construction similar that described with reference to FIG. 3. Thus, according to the present example, each wall element may be releasably connected between the base element and the roof element. This facilitates installation by low skilled operatives, and also facilitates installation in demanding environments. This feature also provides a further advantage, discussed below.

FIG. 5

Third connector assembly components configured to be assembled into a third connector assembly for location between facing ends of neighbouring wall elements and configured to releasably clamp the neighbouring wall elements in an aligned position are shown in FIG. 5.

The apparatus comprises third connector assembly components, indicated generally at 501, comprising at least a first tie connector 502 and a second tie connector 503. In FIG. 5, the third connector assembly components 501 are shown in use with a first wall element 105 and a second wall element 504, in which the third connector assembly extends between the facing ends 505, 506 of the neighbouring wall elements 105, 504 and clamps across the neighbouring wall elements 105, 504. Each one of the tie connectors 502, 503 applies a force to a pair of corresponding faces of the neighbouring wall elements 105, 504. In this example, the first tie connector 502 extends along one side of the wall surface, indicated by arrow 507, and the second tie connector 503 extends along the other side of the wall surface, indicated by arrow 508. As indicated generally at 509, the third connector assembly components 501 provide an adjustable mechanical link.

Other features of modular assembly shelter apparatus are also illustrated in this Figure. For example, a waterproof seal 510 may be provided in regions of contact between parts of the modular assembly shelter apparatus. As another example, a cover element, indicated generally at 511, such as a plate or strip, may be provided to safely cover parts and/or improve the aesthetic appearance of an internal or external region. A connector assembly element may be fabricated from any suitable material or combination of materials and may be manufactured by any suitable technique or combination of techniques. In an example, an extrusion process is performed to produce a connector assembly component.

FIG. 6

A corner element 104 is illustrated in FIG. 6. Corner element 104 defines a hollow internal volume, indicated by arrow 601. In an example, this internal volume 601 is used to house a drainpipe 602, for receiving runoff water from guttering of the shelter and directing it to a suitable outlet. Other items may be received within the hollow corner element. A corner element may be fabricated by any suitable material or combination of materials. Any suitable components and techniques may be used to secure the corner elements at the intended locations during the build of the rigid shelter.

FIG. 7

FIG. 7 shows a support device configured to be releasably connected relative to the base element, for supporting the base above ground level.

In this illustrated example, support device 110 is configured to be secured relative to base element 102. Preferably, each of the plurality of support devices is configured to be adjustably connected relative to the base element. According to this example, the support device 110 is configured to be adjustable in a first direction, indicated by arrow 701, along the length of base connector 302. Preferably, the support device is configured to slide along the base connector, and hence in turn along the base element (not shown in the Figure). When the desired positioning of the support device is achieved, the support device may then be fixed at that position by use of any suitable securing means. This feature serves to accommodate variations in where a suitable footing may be found and deviations from a planned footing location. A support device may also be configured to be adjustable in a second direction, as indicated by arrow 702, which is substantially perpendicular to the first direction indication by arrow 701. This serves to facilitate levelling of the base element, and the rigid shelter a whole. Thus, a support device may be adjustable in a substantially horizontal direction relative to the supporting surface and in a substantially vertical direction relative to the supporting surface, to facilitate orientation of the rigid shelter relative to the supporting surface. Preferably, the modular assembly shelter apparatus enables any number of support devices to be utilised as appropriate. This feature functions to increase the usability of the rigid shelter in a range of environments.

Other features of modular assembly shelter apparatus are also illustrated in this Figure. The modular assembly shelter apparatus may, as in this example, comprise extruded elements. An extruded element may present one or more supporting profiles configured to releasably support electrical cabling or plumbing piping. For example, base connector 302 is an extruded element and presents supporting profiles, such as those generally indicated at 703 and 704, configured to support electrical cabling. In this way, provision for utility components is provided. This approach serves to reduce costs, be providing multi-purpose elements and reducing material quantity, and also to reduce aesthetic disruption by enabling the installation of cabling and/or piping at a discrete location and in a tidy manner.

FIG. 8

FIG. 8 illustrates an example configuration of a rigid shelter provided by a modular assembly shelter apparatus. A first configuration 801 of a rigid shelter is shown. The modular assembly shelter apparatus comprises at least one internal partition element 802, and rooms, such as room 803, are defined. A second configuration 804 of a rigid shelter is shown. The first and second configurations 801, 804 are achievable using the same modular assembly shelter apparatus. The modular assembly shelter apparatus as described herein thus advantageously allows for different configurations to be created, to achieve a desired floor plane shape, or to allow a rigid shelter to be shaped around an obstacle, such as a tree 805. As will be described in further detail below, modular assembly shelter apparatus may be received, assembled to provide a rigid shelter comprising a solar-powered electrical supply circuit, disassembled into apparatus ready for assembly and reassembled again to provide a rigid shelter comprising a solar-powered electrical supply circuit. As illustrated in this figure, this process may be performed to provide a first rigid shelter having a first configuration and then to provide a second rigid shelter having a second configuration that is different from the first configuration. An internal or external configuration of a unit of, or the whole of, a rigid shelter may be symmetrical about an axis or may be irregular.

It is to be appreciated that a variety of internal configurations may be achieved in a rigid shelter as provided by the modular assembly shelter apparatus. The internal partition elements are not required to be load bearing. An internal partition element may be rigid or flexible, may comprise open areas, a window, a hatch, a door, or other similar feature. A partition element may be fabricated from any suitable material or combination of materials, for example one or more of wood, glass, plastic or textile. An internal partition element may be installed at a desired internal location by any suitable means and techniques, for example by means of brackets, rails, screws or other suitable mechanical fixings, and possibly in combination with adhesive. An internal partition may be configured to be free-standing. Thus, an internal partition element may be repositionable. Different internal partition elements may be selected for different types of rigid shelter. Internal partition elements may, in some circumstances, be used to achieve convenient reassignment of the purpose of the rigid shelter. Any number of rooms or areas within a rigid shelter or nominated floor space may be defined as appropriate. Any type of room may be nominated, for example, a bedroom, a living room, a kitchen, a bathroom, a storage room, an office, a treatment room. Fixtures, fittings and accessories may then be provided accordingly.

As illustrated in this Figure, the rigid shelter has a unit floor area, and similarly a unit roof area, as defined between corner elements. In this embodiment, the unit has a substantially rectangular footprint, as indicated at 806. This feature advantageously allows the tessellation of duplicate floor areas, along with other flanking arrangements of floor areas. Units may be arranged in a series, arranged to form a central 'courtyard' space or in any other arrangement. A unit base area, and similarly a unit roof area, may comprise any number of base elements and roof elements respectively.

FIG. 9

FIG. 9 shows a schematic of utility provision. The modular assembly shelter apparatus comprises a solar energy derived electricity supply, however, one or more further utilities may be provided.

As indicated, the utility panel 108 is connected to a first input 901 for solar energy derived electricity. Electricity generated from solar energy received by the photovoltaic solar collector 106 is stored in an electricity storage device 109, such as a battery, from where it may be subsequently sourced. The utility panel 108 is connected to a first output 902 for the supply of electricity. A second input 903 may be provided for an alternative source of electricity, such as may take the form of an engine-generator.

In addition to electrical circuit componentry, the modular assembly apparatus may also comprise plumbing circuit componentry. Plumbing circuit componentry may be utilised in the provision of water and/or gas. Hence, a third service input 904 may be provided for water along with a second output 905, again for water. Similarly, a fourth service input 906 may be provided for gas along with a third output 907 also for gas. Further, the modular assembly shelter apparatus may comprise a solar thermal collector.

To facilitate quick and easy assembly/disassembly of the resultant rigid shelter, the electrical and any plumbing circuit componentry is provided as an array of modular sections that are connectable in a simple manner. For example, connectors, such as mechanical connector 908, may provide releasable connections that operate with a push-fit, snap-fit, plug or clip together style action, a twist action or a friction-fit action. The type of connector used may be selected to suit particular types of equipment to be connected, and hence a variety of connector types may be provided. To facilitate connection/disconnection of circuit componentry, the utility panel 108 may be provided with at least one access hatch 909. The utility panel may also include a ventilation panel area 910.

FIG. 10

FIG. 10 shows features of a utility panel. Utility panel 108 may comprise control devices, indicators and any other service management devices as appropriate to a particular application. For example, a utility panel may comprise any of the following: a power supply control device 1001, a power input type indicator 1002, a power output type indicator 1003, an operating voltage indicator 1004, a power input gauge 1005, a power output gauge 1006, a stored power gauge 1007, an electric plug socket 1008, a switch 1009, a water supply control device 1010, a water input gauge 1011, a water output gauge 1012, a stored water gauge 1013, a gas flow control device, 1014, a gas input gauge 1015, a gas output gauge 1016, a stored gas gauge 1017, a diagnostics device 1018, a power supply register device 1019, a power supply termination device 1020, along with any other desired appliance to enable, for example safe operation, efficient operation, monitoring of service operation and functionality. Remote operation of functions/devices of a utility panel may be provided, for example to allow remote monitoring or data download from a diagnostics device. Heating functions may be provided, for example for heating water, for under floor heating or for space heating. Other features may be incorporated into a utility panel. For example, the rigid shelter may comprise security or communications devices. It is to be appreciated that the modular assembly shelter apparatus or a particular utility panel may provide one or more energy management functions.

FIG. 11

FIG. 11 illustrates examples of energy management functions that may be provided for by the modular assembly shelter apparatus. A first function serves to ensure careful use of energy and a second function serves to ensure a steady energy supply. The first function enables a predetermined limit of energy supply to be detected and, in response, to terminate the energy supply to highlight that 'an energy ration' has been used. The second function serves to detect a low level of solar energy derived electricity and, in response, to initiate the supply of electricity from an alternative, back-up source. For example, at step 1101 a question is asked as to whether an electricity output limit has been reached. If this question is answered in the affirmative, step 1102 is entered where the electricity output is terminated. From this position, step 1103 may be entered whereby the electricity supply may be activated again. However, it is envisaged that the inconvenience of the termination of the electricity supply and the requiring of a positive act to re-establish the supply will make users of the rigid shelter aware of their electricity usage which, in turn, will serve to encourage good practice and careful usage. Alternatively, if the question asked at step 1101 is answered in the negative, then step 1104 is entered where a question is asked as to whether the stored solar derived electricity supply is low. If this question is answered in the negative, then step 1101 is again entered. If, however, the question asked at step 1104 is answered in the affirmative, then step 1105 is entered, where the supply of electricity from the alternative source, such as an engine-generator, is initiated. Thereafter, step 1101 is again entered. It is to be appreciated that steps illustrated in this Figure are only examples of energy management procedures that may be provided in order to monitor and encourage desirable energy use practices.

FIG. 12

Modular assembly shelter apparatus as described herein may be arranged in a variety of configurations with further elements and components provided to achieve a desired floor layout.

As illustrated in FIG. 12, the modular assembly shelter apparatus may comprise a base element 1201, a roof element 1202 and wall elements 1203. As will be described in further detail, a corner element, such as corner element 104, may of course be used at a corner, such as corner 1204, of a rigid shelter but may also be used at an adjoining location, such as adjoining location 1205, along with another corner element 1206. Between corner elements, a unit is defined. Thus, as indicated, adjoining location 1205 is between a first unit, indicated generally at 1207, and a second unit, indicated generally at 1208. The first and second units 1207, 1208 are assembled side by side, and are configured to provide a single floor level only. In an alternative arrangement, the first and second units 1207, 1208 are assembled side by side, but are configured to provide a split-level floor. Units having a substantially rectangular footprint may be connected along the long sides or short sides thereof. Where adjacent units connect, a reinforcing element is usable to span across the edges of the units where wall elements would be otherwise.

The modular assembly shelter apparatus may comprise a storey element 1209, configured to be assembled by the rigid the shelter having an additional storey 1210. The storey element 1209 is configured to provide a ceiling for a lower unit 1211 and a floor for an upper unit 1212 located upon the lower unit 1211. It is hence to be appreciated that units may be arranged so as to extend the floor area of a particular level and may also be arranged to provide an additional level. It is also to be understood that the dimensions of a unit may be varied by varying the number of wall elements used between corner elements. A multi-storey shelter may be provided having more than two storeys.

In an example, the wall elements have a panel width, in the direction shown by arrow 1213, of approximately 1276 mm, and a panel height, in the direction shown by arrow 1214 of approximately 2820 mm.

Elements and components of the apparatus may include features beyond those required to enable the element or component to be incorporated into a rigid shelter in a single way. For example, elements and components may define extra apertures or threaded bores. The apparatus may therefore comprise additional fixing means or self-tapping screws for example, to allow flexibility of how units may be erected and secured together and to allow for variety in the style of each build.

FIG. 13

FIG. 13 shows a first corner element 104 and a second corner element 1301 in a linked assembly. In the shown arrangement, the first and second corner elements 104, 1301 are in mirror image about axis 1302. It can be seen that the first and second corner elements 104, 1301 are in an abutting arrangement.

FIG. 14

FIG. 14 shows corner element 104 and corner element 1301, again in a linked assembly, and again in mirror image about a central axis 1302. However, in this shown arrangement, a reinforcement element 1401 is located between the first and second corner elements 104, 1301 and through which axis 1302 extends. Reinforcement element 1401, disposed between the corner elements 104, 1301, acts as a strengthening structural member. An intermediate reinforcing element allows the number of units that may be arranged in an adjoined series to be increased without compromising the structural integrity of the resultant rigid shelter configuration. A reinforcing element may be fabricated from any suitable material or combination of materials. The additional strength provided by use of one or more reinforcement elements may serve to increase the overall resistance of the resultant rigid shelter to harsh weather conditions, such as strong winds and rain, or earthquakes.

FIG. 15

An eaves beam assembly is shown in FIG. 15. A first eaves beam assembly, indicated generally at 1501, and a second eaves beam assembly, indicated generally at 1502, are shown in a linked arrangement. In the shown arrangement, the first and second eaves beam assemblies, 1501, 1502 are in mirror image about axis 1503. It can be seen that the first and eaves beam assemblies, 1501, 1502 are in an abutting arrangement.

FIG. 16

FIG. 16 shows the eave beam assemblies 1501, 1502, in a linked assembly, and again in mirror image about a central axis 1503. However, in this shown arrangement, the eave beam assemblies 1501, 1502 are connected indirectly. In the shown arrangement, a first reinforcement element 1601 and a second reinforcement element 1602 is positioned between the first eave beam assembly 1501 and the second eave beam assembly 1502 to provide structural stability. The second reinforcement element 1602 is located immediately above the first reinforcement element 1601. The central axis 1503 extends through these reinforcement elements 1601, 1602.

A reinforcing element may be fabricated from any suitable material or combination of materials. A reinforcing element may be manufactured by any suitable technique or combination of techniques.

Hence, the modular assembly shelter apparatus may comprise further elements and components. As further examples, under floor heating apparatus may be provided and interior coverings, such as floor, wall and ceiling coverings, may be provided. Electrical equipment may be included to suit specified requirements. In an example, the outer surfaces of the roof and wall elements are contoured to provide substantially vertical outwardly projecting ribs or peaks, which function to provide rigidity. Other aspects, such as guttering and rain caps may be supplied.

FIG. 17

FIG. 17 shows modular assembly shelter apparatus 101 in a portable unit configuration. In this shown example, portable unit configuration 1701 base element 102, roof element 103 are spaced apart to provide an internal volume in which remaining apparatus is received. A protective element 1702 is located to extend around the internal volume. The protective element 1702 may be fabricated from any suitable material or combination of materials.

The portable unit configuration 1701 is configured to allow plurality of like portable unit configurations to be stacked into a shipping container arrangement. A typical volume of a standard shipping container is indicated at 1703. In an example, portable unit configurations are stackable to an equivalently dimensioned volume. The individual portable unit configurations may then be connected or otherwise secured together as a shipping container. Thus, a protective element may be provided around individual portable unit configurations and may be provided around a plurality of individual portable unit configurations. Alternatively, portable unit configurations are stackable in an arrangement configured to fill a shipping container. The portable unit configuration is such that the volume used to pack the modular shelter assembly apparatus is minimised, and is such that space between portable unit configurations is minimised. These features allow for maximisation of available space and reduction of the carbon footprint and materials when transporting the apparatus. It is to be appreciated that the modular assembly shelter apparatus is conveniently configurable into a portable arrangement that may be conveniently transported by road, rail, sea and/or air routes to the receiving location.

FIG. 18

FIG. 18 shows the modular assembly shelter apparatus 101 being delivered to a desired receiving site. The modular shelter apparatus is configured to be transported by use of traditional and standard methods. The portable unit configuration is such that, as required, lifting straps or chains for example may be used to relocate the apparatus from one level to another level, and a fork lift truck for example may also be used to convey the apparatus. The apparatus, once unloaded from a vehicle 1801, may be manually manoeuvred to a desired plot, by one or more operatives, such as operatives 1802 and 1803. Thereafter, the operatives may proceed with the build of a rigid shelter comprising a solar powered electricity supply circuit.

FIG. 19

As shown in FIG. 19, after a rigid shelter comprising a solar powered electricity supply circuit is no longer required at an existing location, the modular assembly shelter apparatus as described herein advantageously allows for the rigid shelter to be manually dismantled such that disassembled parts, such as disassembled part 1901, are obtained.

As previously described, the modular assembly shelter apparatus comprises connector assembly components for releasably and detachably connecting each wall element 105 to a base element 102 and also to a roof element 103, thereby facilitating the dismantling process. The provision of circuit componentry in modular sections that are releasably connectable also assists this procedure. Beneficially, dismantled parts may be reused. Thus, the modular assembly shelter apparatus as described herein serves to reduce wastage, through allowing parts to be used again, and also allows for rigid shelters to be conveniently relocated from one site to another site. The reusable nature of disassembled parts also allows for the layout of a rigid shelter to be adapted or modified. In an embodiment, the apparatus is configured to be assembled, disassembled and reassembled using known manually operable tools.

Preferably, the design of parts of the modular assembly shelter apparatus provides as few different parts, as possible especially for similar purposes, especially those parts that are usable for similar purposes. From a manufacturing perspective, this serves to reduce production and wastage costs. From an operative's perspective, this serves to reduce the complexity of understanding the parts and how they are used to complete the build process. This enables operatives to become familiar with the parts, and to gain confidence building with the parts, more quickly. Advantageously also, replicating a design increases the likelihood and speed of sourcing additional or replacement parts and improves the probability that sound disassembled parts can be reused in another build. This is particular beneficial in geographical areas that are difficult to service with supplies.

FIG. 20

FIG. 20 shows steps in a method of providing a rigid shelter comprising a solar powered electricity supply circuit. According to method 2001, at step 2002, disassembled parts are received from a rigid shelter assembled from the modular assembly shelter apparatus and, at step 2003, the disassembled parts received at step 2002 are reused in the assembly of the rigid shelter. Thus, disassembled parts may be received from the disassembly of a rigid shelter comprising a solar powered electricity supply circuit, those disassembled parts may then be recycled into another set of modular assembly shelter apparatus and subsequently that apparatus may be assembled to provide another rigid shelter comprising a solar powered electricity supply circuit. The reuse of modular assembly shelter apparatus parts facilitates the provision of a shelter having a renewal energy power supply.

The modular assembly shelter apparatus as described herein may be selected to provide a desired resultant rigid shelter comprising solar powered electricity supply circuit. This allows for a procurer to select the size of the shelter, the layout of the shelter, the services of the shelter and a supplier to correspondingly prepare and dispatch a portable unit configuration matching the chosen specification. This conveniently allows for convenient selection of a rigid shelter comprising a solar powered electricity supply circuit and for convenient fulfilment of that order. The modular approach to providing a rigid shelter comprising solar powered electricity supply circuit also allows for parts to be reused.

Therefore, the modular assembly shelter apparatus as described herein provide advantageous configurability of a rigid shelter comprising a solar powered electricity supply circuit.

The invention claimed is:

1. A method of providing a second rigid shelter comprising a solar powered electricity supply circuit, in which an external surface of said second rigid shelter presents photovoltaic material, said method comprising the steps of:
   a) receiving disassembled parts obtained from the disassembly of a modular assembly shelter apparatus configurable into a first assembled configuration providing a rigid shelter including a solar powered electricity supply circuit in which an external surface of said rigid shelter presents photovoltaic material, wherein said modular assembly shelter apparatus comprises:
   a base element,
   a roof element,
   a plurality of corner elements, and
   a plurality of wall elements,
   each of said wall elements being configured to be detachably connected between and to said base element and said roof element and to be detachably connected to one or more other wall element;
   wherein in use said rigid shelter comprises:
   a floor,
   a roof,
   and a plurality of walls, and
   wherein said solar powered electricity supply circuit comprises:
   a photovoltaic solar connector comprising photovoltaic material, an electricity storage device for storing electricity generated from solar energy received by the photovoltaic solar collector, electrical circuit componentry, and a utility panel;
   said modular assembly shelter apparatus being configurable from a portable unit configuration into said first assembled configuration providing said rigid shelter, including said solar powered electricity supply circuit in which the external surface of said rigid shelter presents the photovoltaic material, wherein a first external shelter element comprises solar energy collector cells that form part of said first external shelter element,
   b) providing the modular assembly shelter apparatus comprising said disassembled parts received at step a), and
   c) configuring said modular assembly shelter apparatus provided at step b) into a second assembled configuration providing a rigid shelter comprising the solar powered electricity supply circuit, in which a second external surface of said second rigid shelter presents the photovoltaic material, wherein the second external shelter element of the second rigid structure comprises the solar energy collector cells that form part of the first external shelter element.

2. The method of providing a rigid shelter of claim 1, wherein the second assembled configuration of the rigid shelter of step c) has a different footprint than the first assembled configuration of the rigid shelter of step a).

\* \* \* \* \*

UNITED STATES PATENT AND TRADEMARK OFFICE
CERTIFICATE OF CORRECTION

| | |
|---|---|
| PATENT NO. | : 8,973,335 B2 |
| APPLICATION NO. | : 13/148008 |
| DATED | : March 10, 2015 |
| INVENTOR(S) | : Derick Wilson |

It is certified that error appears in the above-identified patent and that said Letters Patent is hereby corrected as shown below:

In the Claims

Column 12, Line 33: Claim 1, Delete "photovoltaic solar connector" and insert -- photovoltaic solar collector --

Signed and Sealed this
Eleventh Day of August, 2015

Michelle K. Lee
*Director of the United States Patent and Trademark Office*